United States Patent [19]
Masi

[11] 3,844,637
[45] Oct. 29, 1974

[54] INTEGRATED LIQUID CRYSTAL LUMINOPHOR DISPLAY

[75] Inventor: James V. Masi, Huntington, Conn.

[73] Assignee: Bunker Ramo Corporation, Oak Brook, Ill.

[22] Filed: Aug. 29, 1973

[21] Appl. No.: 392,458

[52] U.S. Cl............................ 350/160 LC, 252/408
[51] Int. Cl.............................................. G02f 1/16
[58] Field of Search....... 350/150, 160 LC; 252/408

[56] References Cited
UNITED STATES PATENTS 3,775,631  11/1973  Morikawa.................. 350/160 LC X Primary Examiner—Edward S. Bauer
Attorney, Agent, or Firm—Frederick M. Arbuckle; R. J. Kransdorf

[57] ABSTRACT

An improved display device is provided utilizing a luminophor mixed with a nematic liquid crystal material. When illuminated with a selected source of radiation, the luminophor is excited to visibility, emitting a characteristic color over a wide angle. This approach may be used with liquid crystal displays operating in the dynamic scattering and field effect modes.

5 Claims, 2 Drawing Figures

PATENTED OCT 29 1974

3,844,637

INTEGRATED LIQUID CRYSTAL LUMINOPHOR DISPLAY

BACKGROUND OF THE INVENTION

This invention relates to a liquid crystal display device, and more particularly to a device of this character incorporating a luminophor with a nematic liquid crystal material in which the luminophor is excited to visibility by the application of external radiation, emitting a characteristic color over a wide angle.

Liquid crystals are materials whose molecules are rod-shaped and arranged in ordered groupings. The molecular structure contains electric dipoles whose movement in an electric field controls their optical behavior. The nematic liquid crystal material which is employed in this invention has a negative dielectric anisotropy, which means that the component of the dipole movement perpendicular to the molecular axis is greater than that parallel to it. This dipole movement in the presence of an electric field produces dynamic scattering or field effects which are two electro-optical effects making the liquid crystal useful for display purposes.

In the dynamic scattering mode, the liquid crystal molecules are aligned in uniform order with no field applied, and are transparent to light. When an electric field is applied, ions migrate across the material, disturbing the molecules and forming boundaries of different indexes of refraction throughout the liquid crystal material, producing light scattering.

In the field effect mode, electrodes of a display cell are treated such that the molecules have an orientation pattern which turns 90° when no field is applied. When light is directed perpendicular to the cell, the plane of polarization rotates 90° as the light is transmitted from one side to the other. On the application of an electric field, the molecules are rearranged so that their orientation no longer produces a 90° twist, and light passes without a change in the plane of polarization. By using a pair of parallel polarizers, light transmission through the cell will be a minimum with no applied field, and a maximum with an applied field, with the display exhibiting white on a black background. When using crossed polarizers, maximum transmission occurs with no applied field, and appears on a display as black on a white background.

Utilizing the above electro-optical effects, and by shaping one of the display cell electrodes into patterns or segments, when the display is activated, numerals, letters, or patterns are presented on the display. Among the problems encountered in providing a general purpose liquid crystal display using the aforesaid electro-optical effects is the lack of visibility or contrast. Reflective displays in particular must be carefully mounted to prevent specular reflection of ambient light to the eye of the observer. Contrast ratios change strongly with viewing angle, particularly for reflective displays, since at certain angles front surface reflections compete with light reflected from a back surface of the cell. If ambient light levels are too low to provide good contrast with a reflective display, then a transmissive display must be employed, using an auxiliary light source. Nevertheless, the sharp changes in contrast ratio are ever present, and, for example, vary from 25:1 to 4:1 as the viewing angle increases to 40° for reflective displays, and 85° for transmissive displays.

Accordingly, it is an object of this invention to provide an improved liquid crystal display device which provides improved visibility of the display over a wide angle.

SUMMARY OF THE INVENTION

In carrying out this invention in one illustrative embodiment thereof, a nematic liquid crystal material is mixed with a luminophor, and illuminated by a selective emitter such as an ultraviolet source, which excites the luminophor to visibility of a characteristic color over a very wide angle.

DESCRIPTION OF THE PREFERRED EMBODIMENTS

In the present invention, a general purpose display is employed, utilizing a nematic liquid crystal material. Since displays employing this material in the past have suffered from visibility problems, particularly at different viewing angles, the present invention treats this problem by incorporating a luminophor which is mixed with the nematic liquid crystal material. The luminophor as used herein refers to any organic material which makes the liquid crystal luminescent in the presence of visible or ultraviolet light. The luminophor is in the form of a suitable organic fluorescent material such as fluorescein, rhodamine, anthracene, penanthrone, etc., and includes organic phosphorescent materials where longer persistence is required or is desirable. The molecules of the luminophors attach and align themselves with the molecules of the liquid crystal, and have little or no optical effect in the absence of an electric field. The mechanism of attachment to the molecules of the liquid crystal, whether it be in solution or in the nature of a chemical bond, is not important, but the attachment must be such that the luminophor molecules move with the molecules of the liquid crystal for the luminophor to be useful. When a liquid crystal containing the luminophors is employed in a display and has an electric field applied thereto, it changes from a non-ionic to the ionic state. By applying ultraviolet illumination, the luminophor is then excited to visibility in the affected area of the liquid crystal, emitting a characteristic color, depending on the luminophor, over a very wide angle. For example, the fluorescein when activated by the ultraviolet radiation emits a green-to-yellow color, while the rhodamine emits a green-to-red color. The wide angle emission of the luminophor is due to the fact that each photo-excited luminophor molecule acts as an independent, non-Lambertian source, causing the electrically excited surface to glow in its characteristic color. The molecules of the luminophor absorb shorter wavelength radiation, emit longer wavelength radiation, and do not truly scatter, as is the case of the nematic liquid crystal in the absence of the luminophor.

Any of the nematic liquid crystal materials, such as MBBA [N-(p-methoxybenzylidene)-p-n-butylaniline], EBBA [N-(p-ethoxybenzylidene)-p-n-butylaniline], or a combination of MBBA and EBBA, may be employed along with a suitable luminophor. An illustrative example of a solution which may be incorporated into a suitable display cell may take the form of 1 ml. MBBA, 0.1 gr. sodium fluorescein, 0.1 ml. acetone which is utilized for mixing purposes. This mixture could then be sandwiched in a standard parallel plate-type configuration for a liquid crystal display and excited by 0–30 v. A.C. at 60 hertz or higher.

Figure 1:
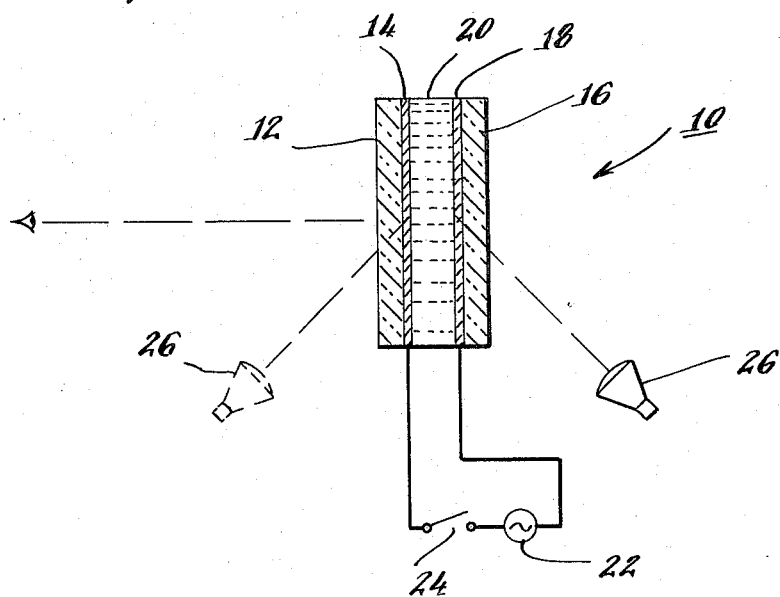
FIG. 1 illustrates one embodiment of the present invention, utilizing the dynamic scattering mode for a liquid crystal display.

Turning now to FIG. 1, there is shown a standard parallel plate-type display referred to generally with the reference character 10, illustrating a display using the dynamic scattering mode. A mixture of the nematic liquid crystal and luminophor 20 is placed between two parallel plates 12 and 16 of suitable material, such as glass, which are coated with electrical conductors 14 and 18, respectively. If a transmissive type display is utilized, the electrodes should be transparent, while if operating by reflecting ambient light, the rear electrode 18 should be highly reflective coating or film, such as aluminum. In the reflective mode, a mirror might also be used behind the plate 16. An electric field is placed across the thickness of the liquid film luminophor material 20 by an A.C. generator 22 connected across the electrodes by switch 24. The electrode 14 may be shaped into patterns or segments so that when the display is on, activated by switch 24, numerals or letters can be presented to the eye of the observer, which is shown located on the left side for a reflective type display. The luminophor-liquid crystal 20 may be either front or rear illuminated by an ultraviolet source 26. As previously stated, the luminophors align themselves with the molecules of the nematic liquid crystal, and when an electric field is applied across the electrodes 14 and 18, a realignment of the liquid crystals occurs, and ambient light which normally passes therethrough is reflected. With the UV illumination, the luminophor is excited and glows over the area of dynamic scattering in the liquid crystal, emitting the characteristic color, depending on the luminophor, over a wide angle.

Figure 2:
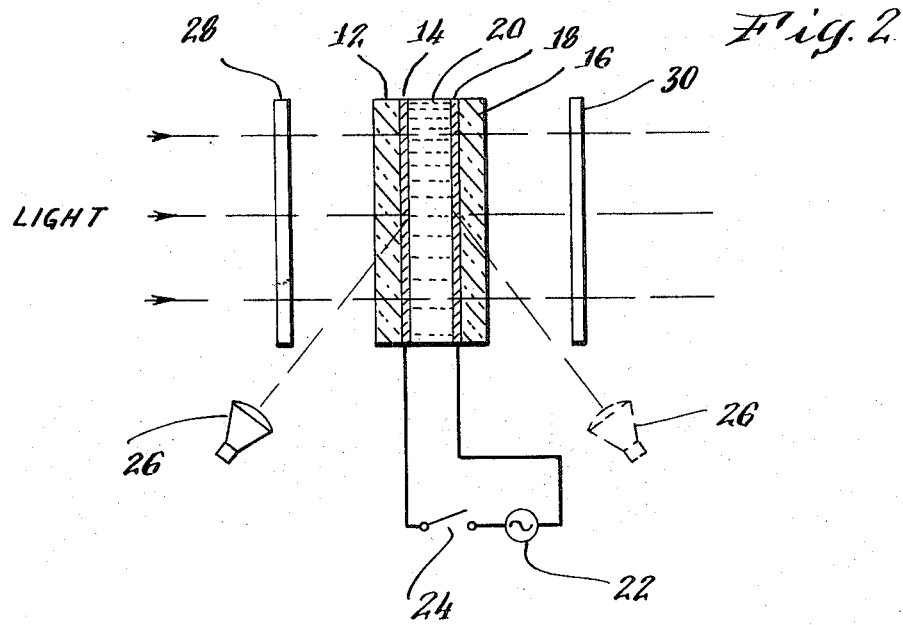
FIG. 2 illustrates another embodiment of the present invention, utilizing the field effect mode in a liquid crystal display.

FIG. 2 illustrates a transmissive field effect display employing the invention, in which the nematic liquid crystal-luminophor 20 is again positioned between two parallel plates 12 and 16, which are electroded at 14 and 18, respectively. An electric field is placed across the electrodes 14 and 18 by a generator 22 and switch 24, and the liquid crystal mixture 20 is either forwardly or rearwardly illuminated by a source of ultraviolet radiation 26. In this embodiment, the electrodes 14 and 18 are prepared or treated to cause the molecules to turn 90° in going from one plate 12 to the other plate 16 when no electric field is applied. Polarizers 28 and 30 are positioned on each side of the plates 12 and 16, as shown. When an electric field is applied across the liquid crystal luminophor 20, the nematic liquid crystal molecules are rearranged so that their orientation no longer shows a 90° rotation, and light passes through the liquid crystal luminophor combination without a change in the plane of polarization. If polarizers 28 and 30 are cross-polarizers, light from the left passes through the liquid crystal 20 and through the cross-polarizer on the other side, to the viewer. A field applied across the electrodes lines up the molecules so that light is unaffected and blocked by the cross-polarizer, which provides an absorber to the right with a light display on a dark background. Paralleling the polarizers 28 and 30 reverses the contrast. A reflective display can also be provided by placing a mirror after the second polarizer 30. By illuminating the liquid crystal luminophor mixture 20 with UV light, the luminophor is activated and emits a characteristic color on a dark background or on a light background, depending on the type of polarizers used.

With the use of the luminophor liquid crystal mixture, and the illumination of the mixture with a selected emitter, such as a UV source, the contrast ratios are greatly improved, whether utilizing a liquid crystal display in the dynamic scattering or in the field effect mode. The display is no longer at the mercy of ambient light conditions, nor is it rendered ineffective because of the viewing angle.

Since other modifications and changes, varied to fit particular operating requirements and environments, will be apparent to those skilled in the art, the invention is not considered limited to the examples chosen for purposes of disclosure, and covers all modifications and changes which do not constitute departures from the true spirit and scope of this invention.

I claim:

1. In a display device having a liquid crystal material positioned between two parallel plates, each plate having electrodes next to the liquid crystal material and an alternating current source connected across the electrodes for providing an electric field across the liquid crystal material, the improvement comprising
   a. a luminophor mixed with a nematic type liquid crystal material in which molecules of the luminophor are attached and move in accordance with the movement of the molecules of the nematic liquid crystal material, and
   b. a predetermined source of radiation applied to the mixture of luminophor and nematic liquid crystal material causing the luminophor to emit visible radiation of a characteristic color over a very wide angle in the presence of said electric field.

2. A display device as set forth in claim 1 wherein said nematic type liquid crystal is selected from a group consisting of MBBA, EBBA, or a combination of MBBA and EBBA.

3. A display device as set forth in claim 1 wherein said luminophor is an organic fluorescent material.

4. A display device as set forth in claim 3 wherein said luminophor is an organic phosphorescent material.

5. A display device as set forth in claim 1 having a polarizer positioned in front of and behind said two parallel plates for providing a field-effect display.

* * * * *